US012041063B2

(12) United States Patent
McIver et al.

(10) Patent No.: US 12,041,063 B2
(45) Date of Patent: Jul. 16, 2024

(54) ELECTRONIC INTERACTION AUTHENTICATION AND VERIFICATION, AND RELATED SYSTEMS, DEVICES, AND METHODS

(71) Applicant: Uledger, Inc., Bainbridge Island, WA (US)

(72) Inventors: Joshua McIver, Meridain, ID (US); Taulant Ramabaja, Prishtina (XK)

(73) Assignee: Uledger, Inc., Bainbridge Island, WA (US)

( * ) Notice: Subject to any disclaimer, the term of this patent is extended or adjusted under 35 U.S.C. 154(b) by 0 days.

(21) Appl. No.: 18/201,108

(22) Filed: May 23, 2023

(65) Prior Publication Data

US 2024/0007481 A1 Jan. 4, 2024

Related U.S. Application Data

(63) Continuation of application No. 17/362,713, filed on Jun. 29, 2021, now Pat. No. 11,695,782, which is a (Continued)

(51) Int. Cl.
| | |
|---|---|
| *H04L 9/40* | (2022.01) |
| *H04L 9/08* | (2006.01) |
| *H04L 9/14* | (2006.01) |
| *H04L 9/30* | (2006.01) |
| *H04L 9/32* | (2006.01) |
| *H04W 12/06* | (2021.01) |
| *H04W 12/069* | (2021.01) |

(Continued)

(52) U.S. Cl.
CPC .......... *H04L 63/123* (2013.01); *H04L 9/0861* (2013.01); *H04L 9/14* (2013.01); *H04L 9/30* (2013.01); *H04L 9/3231* (2013.01); *H04L 9/3247* (2013.01); *H04L 9/3268* (2013.01); *H04L 63/0428* (2013.01); *H04L 63/0823* (2013.01); *H04L 63/0861* (2013.01); *H04W 12/06* (2013.01); *H04W 12/069* (2021.01); *H04W 12/10* (2013.01); *H04W 12/106* (2021.01); *H04W 12/108* (2021.01)

(58) Field of Classification Search
CPC ....... H04L 63/123; H04L 9/0861; H04L 9/14; H04L 9/30; H04L 9/3231; H04L 9/3247; H04L 9/3268; H04W 12/06; H04W 12/069
See application file for complete search history.

(56) References Cited

U.S. PATENT DOCUMENTS

| | | |
|---|---|---|
| 7,882,291 B2 | 2/2011 | Oh et al. |
| 8,296,564 B2 | 10/2012 | Ureche et al. |
| | (Continued) | |

*Primary Examiner* — Beemnet W Dada
(74) *Attorney, Agent, or Firm* — Foley & Lardner LLP

(57) ABSTRACT

Systems, devices, and methods are disclosed for exchanging electronic information over a communication network and, more specifically, to authenticating and verifying data integrity between two or more interacting users exchanging information. A client computing device generates a split secret that is transmitted to a server via two distinct communication channels. The split secret is generated based on a public key of a public-private key pair generated by the client computing device based on a unique identifier. Validity of the public key can authenticate source identity.

13 Claims, 7 Drawing Sheets

Related U.S. Application Data continuation of application No. 16/709,541, filed on Dec. 10, 2019, now Pat. No. 11,070,564, which is a continuation of application No. 15/845,886, filed on Dec. 18, 2017, now Pat. No. 10,594,702.

(60) Provisional application No. 62/435,513, filed on Dec. 16, 2016.

(51) Int. Cl.
    *H04W 12/10*     (2021.01)
    *H04W 12/106*     (2021.01)
    *H04W 12/108*     (2021.01)

(56) References Cited

U.S. PATENT DOCUMENTS

| | | | |
|---|---|---|---|
| 9,455,968 B1* | 9/2016 | Machani | H04L 63/0428 |
| 9,898,100 B2 | 2/2018 | Ribeiro | |
| 10,361,870 B2 | 7/2019 | Chow et al. | |
| 10,594,702 B2 | 3/2020 | McIver et al. | |
| 2006/0182277 A1* | 8/2006 | Sandhu | H04L 9/3297 |
| | | | 380/44 |
| 2007/0281664 A1* | 12/2007 | Kaneko | H04W 8/245 |
| | | | 455/410 |
| 2008/0072035 A1* | 3/2008 | Johnson | H04L 65/611 |
| | | | 713/153 |
| 2017/0078881 A1 | 3/2017 | Lee et al. | |
| 2017/0359314 A1 | 12/2017 | Mathias et al. | |
| 2018/0026784 A1 | 1/2018 | Ward et al. | |
| 2019/0081796 A1 | 3/2019 | Chow et al. | |
| 2019/0095879 A1 | 3/2019 | Eyal et al. | |
| 2020/0195660 A1 | 6/2020 | McIver et al. | |

* cited by examiner

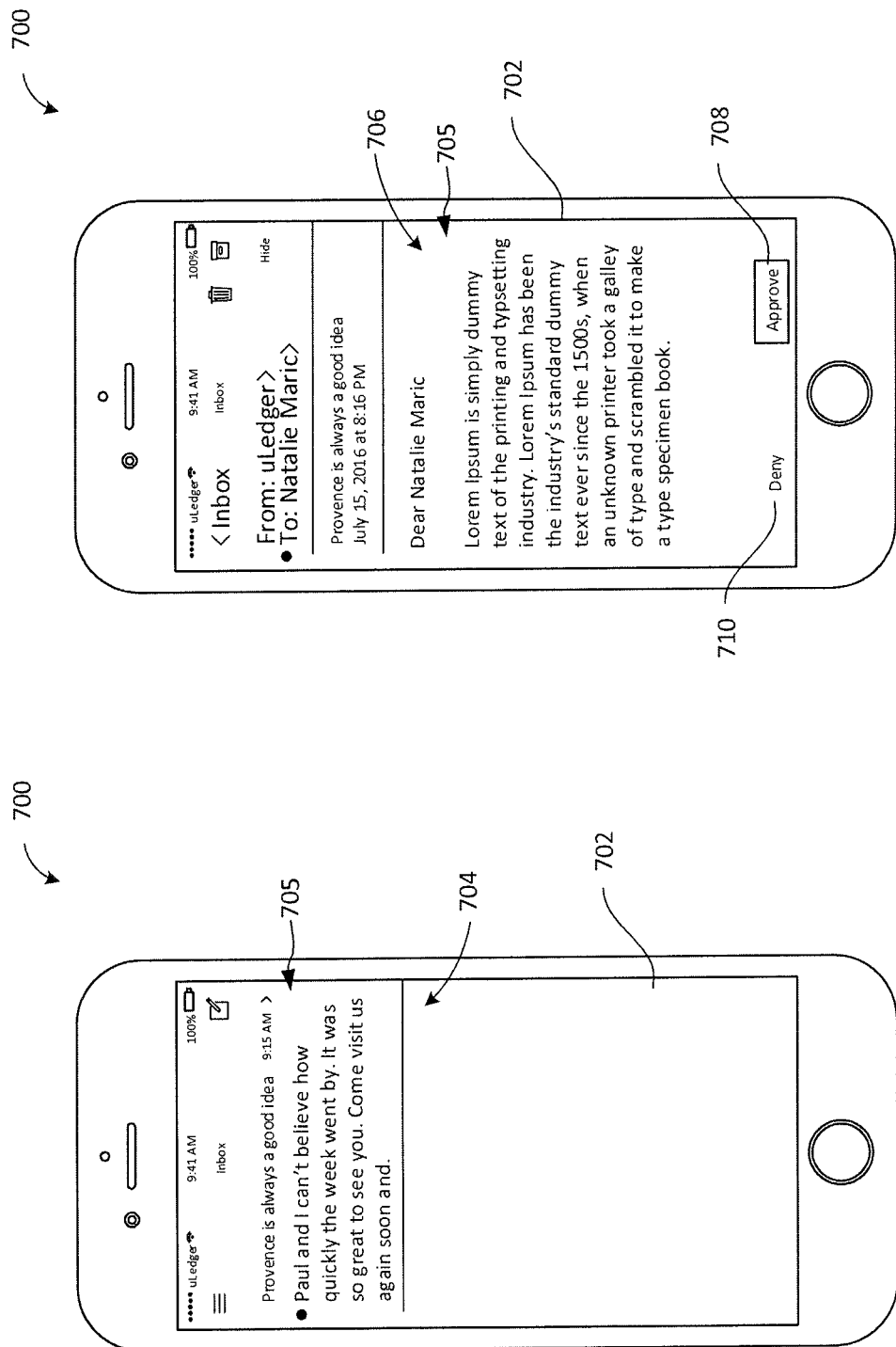

ELECTRONIC INTERACTION AUTHENTICATION AND VERIFICATION, AND RELATED SYSTEMS, DEVICES, AND METHODS

RELATED APPLICATIONS

This application is a continuation of U.S. patent application Ser. No. 17/362,713, filed Jun. 29, 2021, and titled ELECTRONIC INTERACTION AUTHENTICATION AND VERIFICATION, AND RELATED SYSTEMS, DEVICES, AND METHODS, which is a continuation of U.S. patent application Ser. No. 16/709,541, filed Dec. 10, 2019, and titled ELECTRONIC INTERACTION AUTHENTICATION AND VERIFICATION, AND RELATED SYSTEMS, DEVICES, AND METHODS, which is a continuation of U.S. patent application Ser. No. 15/845,886, filed Dec. 18, 2017 and titled ELECTRONIC INTERACTION AUTHENTICATION AND VERIFICATION, AND RELATED SYSTEMS, DEVICES, AND METHODS, which claims the benefit of priority under 35 U.S.C. § 119(e) of U.S. Provisional Application No. 62/435,513, filed Dec. 16, 2016 and entitled ACTIVE EVENT-BASED TRANSACTION AUTHENTICATION AND VERIFICATION, each of which is hereby incorporated by reference in its entirety.

TECHNICAL FIELD

The present disclosure relates to systems and methods for exchanging electronic information over a communication network and, more specifically, to authenticating and verifying data integrity between two or more interacting users exchanging information.

BACKGROUND

Digital communication systems and methods such as email and short messaging service (SMS) text are highly convenient and ubiquitous in daily communication. Significant quantities of useful, entertaining, and even mundane information is exchanged via these digital communication methods. However, these digital communication methods can be insecure and/or otherwise inadequate for exchanging certain types of sensitive information. Users of digital communication systems can easily spoof other users, such as by pretending to be someone they are not when providing information via a digital communication. Further particularly sensitive information may be hacked or modified enroute, or after delivery.

The nature of many current digital communication systems and methods makes them inadequate for exchanging certain types of information, particularly in situations where it is important to be able to detect forgery or tampering. Specifically, where confirmation of the sender of the information or intent of the sender may be critical to the exchange, presently available digital communication systems and methods may be inadequate. Traditionally, communication validation processes have been performed using public key cryptography by single centralized trusted third parties such as a public key exchange server and intermediate fully trusted third parties. With public key cryptography (or asymmetric cryptography) a primary shortcoming is the initial sharing, discovery, association with a real world identity, and continuous authentication and/or revocation of this association, all happening electronically and automatically. Stated otherwise, a central challenge with the use of presently available public key cryptography is obtaining confidence (and proof such as to a third-party) that a particular public key is authentic—i.e., that it is correct and belongs to the person or entity claimed, and has not been tampered with or replaced by a malicious third party.

Similarly, where a likelihood of unauthorized modification of information is high and the validity (or integrity) of the information is critical to the exchange, presently available digital communication systems and methods may be inadequate. Present technologies enable establishment of secure channels of communication. For example, a variety of secure communication standards that use public key technology have been developed, including Secure Hypertext Transfer Protocol (SHTTP), IP Security (IPSec), point-to-point tunneling protocol (PPTP), layer 2 tunneling protocol (L2TP), and virtual private network (VPN). Secure Web communication protocols include secure sockets layer (SSL) 3.0 and the open transport layer security (TLS) protocol that is based on SSL. Existing secure channels of communication ensure verified data is exchanged untampered, and the verification of the data is possible while the secure channel is connected, but verifiability of the integrity of the data is lost when the secure channel connection ends. As a result, there is no ability to verify the integrity of data to a third-party after the exchange of data.

In short, presently available digital communication systems and methods lack authentication that a communication is originating from the perceived sender and lack ability to provide to a third party evidence of verification of the integrity of information or data being exchanged (e.g., verification that information is not modified by some attack). These shortcomings have hampered the development of secure communication in certain settings, such as in circumstances where legal liability may be imposed based on the electronic communication. Some communications simply cannot occur by presently available digital communication systems.

For example, businesses often cannot perform business related actions based on an email or SMS by one of their clients or partners as there is a high risk of an external attack. Attacks range from broad unfocused phishing attacks targeting several businesses all at once, to spear-phishing attacks which generally include the impersonation of somebody in their business network requesting some business critical information, action, or financial transaction. For this problem to be solved a receiver of an email, SMS text, or any other type of transactional-type communication must employ other channels of communication to be sufficiently sure that they are dealing with the intended person, as well as that the message received is unmodified.

Presently this validation of identity and accuracy of communication is achieved through a secondary channel of communication such as a phone call whereby the receiver asks for audio validation of both identity (the sender's voice) as well as intention/request. In other words, parties are communicating through two distinct channels—a primary communication through a first communication channel (e.g., email) and a confirmatory communication through a second communication channel (e.g., a phone call)—which is cumbersome and inefficient for both parties to the exchange. Moreover, a challenge with audio or visual communication for confirmation of a primary communication is that it can be very difficult to keep track of the confirmatory communication providing the validation and such validations can lack sufficient credibility, such as during a legal enforcement. Accordingly, employing audio verification is both burdensome on many businesses, as well as not scalable.

The foregoing shortcomings provide context as to why electronic information exchanges in certain situations (e.g., to facilitate or otherwise exchange data for entering into legally binding contractual arrangements, such as executing digital contracts) generally proceed through a trusted third party such as a digital signature service provider. The risk is effectively assumed by the online service provider. If the online service provider data is hacked or corrupted, it is difficult if not impossible for the contracting parties to retrieve their contracts, and furthermore, often impossible to verify the contract integrity itself.

SUMMARY

The present disclosure provides systems and methods by which digital communication can be both authenticated as to the source and verified as to the integrity of the data. A communication can be securely associated with a sender, as well as that sender's intention and the integrity of the communication can be verified.

Additional aspects and advantages will be apparent from the following detailed description of preferred embodiments, which proceeds with reference to the accompanying drawings.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIGS. 7A and 7B are views of a user interface of a client computing device for authenticated and verified electronic communication, according to one embodiment of the present disclosure

DETAILED DESCRIPTION OF PREFERRED EMBODIMENTS

Figure 1:
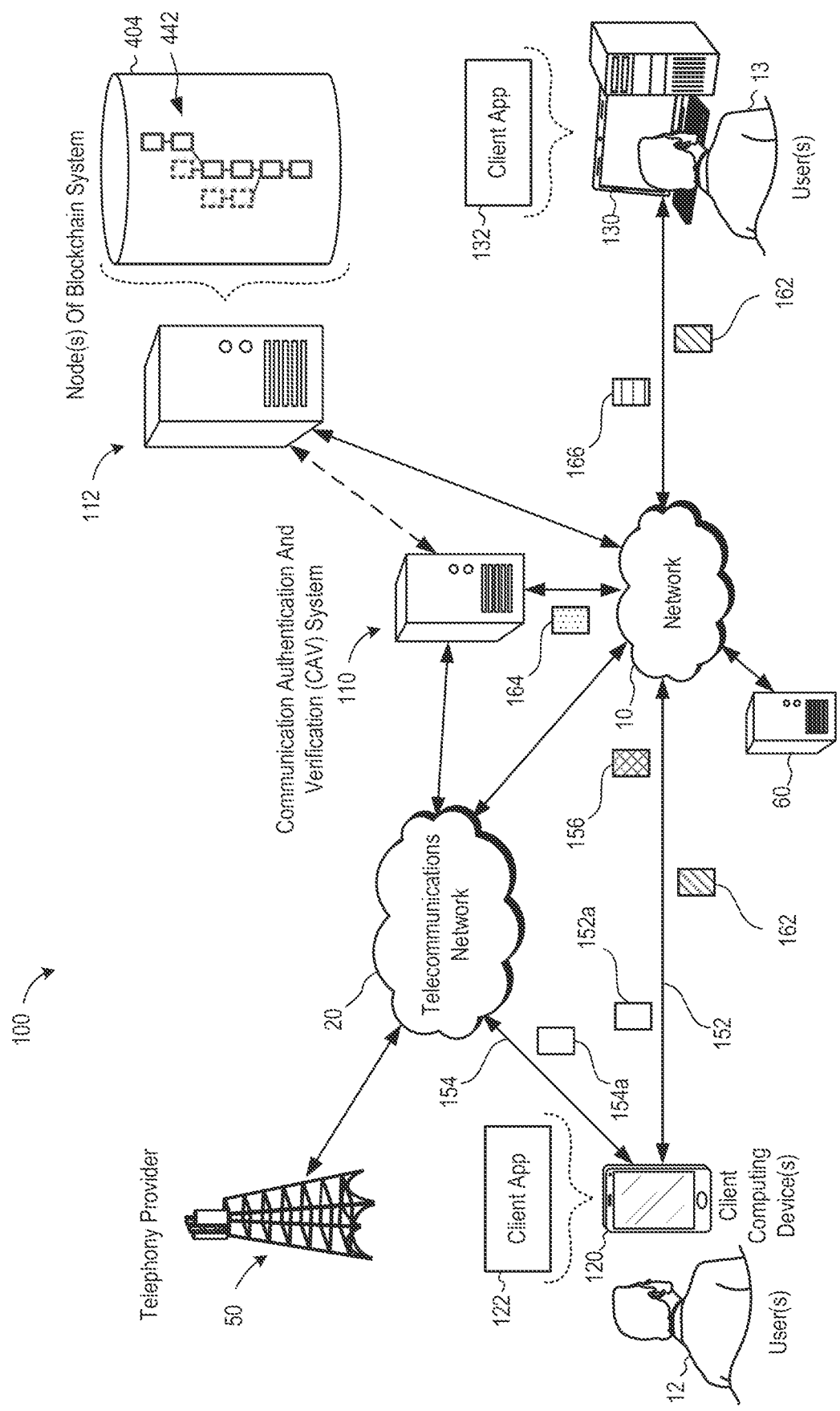
FIG. 1 is a diagram of a system for authenticated and verified electronic communication, according to one embodiment of the present disclosure.

Digital communication is difficult to authenticate and verify due to its ephemeral and remote nature. A sender of a digital communication can easily spoof a receiver, such as by impersonation. Sensitive information may be hacked or modified enroute, or after delivery.

The nature of many current digital communication systems and methods render them inadequate for certain types of exchanges of information. Government and other regulatory agencies may decline or refuse to recognize digital communications for purposes of establishing binding legal obligations or compliance with legal regulations. In instances where confirmation of the source of the information or intent of the sender may be critical to the exchange, presently available digital communication systems and methods may be deemed inadequate or otherwise unacceptable, such as by companies, governments, or regulatory agencies. Similarly, in instances where a likelihood of unauthorized modification of information is high and the validity (or integrity) of the information is critical to the exchange, presently available digital communication systems and methods may be deemed inadequate or otherwise unacceptable. Presently available digital communication systems and methods simply lack authentication that a communication is originating from the purported source or sender and lack ability to provide to a third party evidence of verification of the integrity of information or data being exchanged (e.g., verification that information is not modified by some attack).

These shortcomings of digital communication systems and methods have severely hampered proliferation of digital communication in situations where exchanges of information need to occur that may be legally binding. For example, business entities often cannot, or simply do not, perform business related actions based on an email or SMS by one of their clients or partners because of risk that such actions cannot be upheld by a governing body should a dispute arise. Further, organizations generally refuse to perform exchanges of value (e.g., goods for cash), because such exchanges are susceptible to compromise by external attack (e.g., phishing, spear-phishing, hacking or other data store compromise).

The present disclosure describes systems, apparatus, and methods by which digital communication can be authenticated as to the identity and intention of the sender and verified as to the data integrity of the exchanged data. The disclosed embodiments can operate with any storage system in which the stored data is content addressable. For example, blockchain applications may be particularly complementary to the disclosed embodiments.

The embodiments of the present disclosure may provide authenticated and verified electronic communication at a level of security (and/or immutability) that can enable further proliferation of use of electronic communication in daily exchanges of information, including for exchanges involving sensitive and/or potentially legally binding information.

The disclosed embodiments may authenticate a sender of information by cryptographically associating the communicated data with a real-world identity of the sender in an independently verifiable manner. The authenticity of the sender and the sender's intention is event-based (or interaction-based), associated with the data being sent, and active in that there is a requirement to affirmatively opt-in (e.g., such as by interaction with a device). The authenticity of a sender and the sender's intention is verifiable to anyone who has access to the content-addressable storage system (e.g., a blockchain data storage system), and perpetuates beyond a single application or centrally-controlled system.

The disclosed embodiments may provide verification as to the integrity of data that is sent, specifically that the data has not been tampered with or modified in an unauthorized manner and that the data was received from an expected or anticipated source, location, or sender.

An electronic communication, as used herein, involves two parties, such as a communication by a sender to a recipient. An electronic communication may be event-based. A electronic communication may also be interaction-based.

As used herein, an event may be any signal or data arriving to a recipient from a sender that is perceivable as an event. An event may be a unidirectional communication or transfer of data in that a sender may initiate an event, such as by a signal or transmission of data, and a recipient need not acknowledge the event (at least not to the sender). The recipient need not even be aware of the event.

As used herein, an interaction may be an electronic communication involving an exchange of data. An interaction may be a two-way electronic communication in which two parties provide each other information by exchanging data. Both parties to an interaction have knowledge of the exchange of data. The parties may be sharing content or information, such that a single party both sends and receives data. An interaction-based electronic communication may be useful in the context of facilitating a business transaction in which both parties to the transaction provide something (e.g., agreement to provisions, something of value (goods, services, money). An interaction may be a two-sided event.

Reference is now made to the figures in which like reference numerals may refer to like elements. For clarity, the first digit of a three or more digit reference numeral indicates the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

FIG. 1 is a diagram of a system 100 for authenticated and verified electronic communication, according to one embodiment of the present disclosure. The system 100 includes a communication authentication and verification (CAV) server 110, a content addressable storage system 112 (e.g., a blockchain data storage system), a first client computing device 120 (e.g., a sender client computing device 120), and a second client computing device 130 (e.g., a recipient client computing device 130). The client computing device(s) 120, 130 can communicate with the CAV system via a an electronic communications network 10 (e.g., Internet). The client computing device 120 is a mobile computing device that also includes connectivity to a telecommunications network 20 provided by a wireless telephony provider 50. A client app 122, 132 on the client computing device(s) 120, 130 enables users 12, 13 to interface with the system 100. The CAV system 110 can function as a gateway to the content addressable storage system 112, such as by recording actions and/or records in the content addressable storage system 112.

In FIG. 1, a scenario is illustrated of a first user 12 using the first client computing device 120 to send an authenticated and verified communication to the second client computing device 130 for the second user 13. The first client computing device 120 may be a mobile smart phone including a security chip or other secure enclave and issued by the telephony provider 50. The scenario includes some assumptions that the telephony provider 50 is subject to "know-your-customer" laws and has taken measures to confirm the identity of the user 12 to whom the first client computing device 120 (e.g., mobile phone) is issued.

A preliminary step to sending an authenticated and verified communication is authentication of an identity of a user 12 of the client computing device 120, which can be accomplished by sending a split secret via two distinct communication channels. The client computing device 120 generates (e.g., by a security chip) a public-private key pair using a unique identifier of a client computing device 120 as a seed. The client computing device 120 also includes an identification code or number. For example, a mobile telephone may include a subscriber identity module (SIM) card that is issued by the mobile telephony provider. The SIM card includes an International Mobile Subscriber Identity (IMSI), which is a unique identification associated with all cellular networks and is used to identify the user of a cellular network. A client computing device 120 may be other than a mobile telephone, and may include another type of secure enclave including another type of unique identifier. For example a client computing device may include a hardware security module (HSM), a physical computing device that safeguards and manages digital keys for strong authentication and provides cryptoprocessing, and may come in the form of a plug-in card or an external device that attaches directly to the client computing device 120.

A split secret is created by the client computing device 120 (e.g., by a security chip) to include the public key of the public-private key pair and/or the unique identifier of the client computing device. In some embodiments, the split secret includes a timestamp (or a time out) and if the CAV system 110 does not respond to the first client computing device 120 within a predetermined time period from the timestamp, it is assumed that one or both of the channels of communication 152, 154 are compromised.

A first half of the split secret 152a can be transmitted from the client computing device 120 via a first communication channel 152 to the CAV system 110 to establish user control over the first communication channel 152. For example, the first communication channel 152 may be email, such that the first half of the split secret 152a is transmitted to the CAV system via an email message. The sending of the first half of the split secret 152a by email evidences control over that first communication channel 152 (e.g., control over the email account and ability to send a message from that email account). In some embodiments, the first half of the split secret 152a includes a timestamp and if the CAV system 110 does not respond to the first client computing device 120 within a predetermined time period from the timestamp, it is assumed the first channel of communication 152 is compromised.

A second half of the split secret 154a can be transmitted from the client computing device 120 via a second communication channel 154 to the CAV system to establish user control over the second communication channel 154. For example, the second communication channel 154 may be short message service (SMS) text, such that the second half of the split secret 154a is transmitted to the CAV system via an SMS text message. The sending of the second half of the split secret 154a by SMS text evidences control over that second communication channel 152 (e.g., control over the phone number from which the SMS text was generated and ability to send a message via that phone number). In the case of a mobile telephone number, only the telephony provider 50 is in a position to spoof or pose as the user, because the telephony provider 50 is the only party with access to the SIM and/or IMSI of a mobile phone. Therefore a communication via SMS text, incorporating a split secret (e.g., public key and/or device unique identifier), creates a reliable channel by which to tie a virtual identity to a real world identity. In some embodiments, the second half of the split secret 154*a* includes a timestamp and if the CAV system 110 does not respond to the first client computing device 120 within a predetermined time period from the timestamp, it is assumed the first channel of communication 154 is compromised.

The split communication of the secret (e.g., public key and/or device unique identifier) the CAV system significantly enhances the likelihood that the identity of the user of the client computing device 120 (e.g., mobile smartphone) is known and able to be appropriately authenticated. In order to spoof the CAV system by impersonating the user, the spoofer (e.g., imposter, deceiver) would need to compromise (e.g., gain control) of both communication channels. In the scenario described, the spoofer would need to hack the email account of the user and compromise the mobile telephone number of the user by obtaining the secret (e.g., the public key and/or the unique identifier such as the SIM and/or the IMSI). A likelihood of a single imposter compromising both communication channels 152, 154 is extremely low. As mentioned, under current technology, the mobile telephone company is the only actor in position to compromise the mobile telephone number by obtaining the SIM number and/or IMSI. Telephony companies are highly regulated and beholden to their customers, the public at large, and to regulators, such that misuse of a SIM number and/or IMSI by a telephony provider is both detectable and regulated, and the likelihood of such is extremely low.

The CAV system 110 receives the first half of a split secret 152*a* via the first communication channel 152 and receives the second half of the split secret 154*a* via the second communication channel 154. The CAV system 110 reconstitutes the split secret by combining the first half of the split secret with the second half of the split secret. If the reconstituted secret results in a valid public key, a registration of that public key may occur. The CAV system 110 may confirm the public key received (in the halves of the split secret 152*a*, 154*a*) is a valid public key. A valid public key may be registered, such as on a public key infrastructure (PKI). The PKI may be implemented on the content addressable storage system 112 (e.g., as a blockchain data storage system). The PKI may also be implemented by the CAV system 110.

The registration of the public key may be with an authority entity, such as a certificate authority. The client computing device name (or UID) for purposes of the registration of the public key may be determined a variety of ways. For example:

Name=Hash (PhoneID.PublicKey);
Name=Hash (Hash (PhoneNumber.ServerSecret).PublicKey).

A unique identifier (UID) or name is generated by the user and associated through an identity provider such as a mobile telephony network, enabling digital signatures of transactions, which can more easily be accepted as legally binding. These UIDs are generated on a secure and network connected device which is in exclusive possession of the user, with the UID being partly generated through hashing functions with a secondary communication channel UID (such as a phone number or mobile telecommunications provider's assigned unique PhoneID) together with a Public key of an asymmetric cryptographic function. The UID of the user is generated through the following inputs: (i) a hashing function generating a standard length hash string; (ii) an asymmetric key generating function, generating and storing a public-private key pair exclusively within a secure chip of a client computing device 120, 130 (e.g., a mobile telephony connected device); (iii) a phone number with country prefix, or another mobile telephony provided identifier, used as a human readable name of the user in the system; (iv) the UID can be generated by first concatenating the user's verified phone number or mobile telephony provided identifier with their on-device generated public key and hashing the concatenated string, which creates the content addressable UID. The pseudo-code to this can be expressed as: UID=Hash(PhoneNumber.PublicKey)

The CAV system 110 also transmits an identity certificate to the client computing device to evidence the public key is registered with an authority entity. The identity certificate may be generated by the CAV system 110, or may be generated by the authority entity including the public key. In some embodiments, the CAV system 110 may comprise the authority entity. Stated otherwise, the CAV system 110 may be, or include, a certificate authority and may register the public key and generate an identity certificate 156 that includes the public key received via the split secret from the client computing device 120. In other embodiments, the CAV system 110 may register the public key with a third party certificate authority and may receive the from the certificate authority an identity certificate 156. Registration of the public key may be logged in the content addressable data storage system 112.

The CAV system 110 may be identified, such as on a PKI or with the third-party certificate authority, as:

Name=Hash (PhoneNumber.ServerSecret).

The client computing device 120 receives the identity certificate 156, such as from the CAV system. As noted, the identity certificate 156 provides the client computing device 120 with evidence that the public key is registered (such as on a PKI) with an authority entity, such as a certificate authority. With the identity certificate 156 onboard, the client computing device 120 can provide authentication and verification of electronic communications sent from a first user 12 to a second user 13.

Initiation of sending an authenticated and verified electronic communication can occur a number of ways. In one embodiment, a message 162 (an electronic communication 162) is generated and sent via a communication channel 152 (e.g., email). After the message 162 is sent, a request for authentication and verification (RAV) 164 may be generated. The RAV 164 may be generated from the client app 122 of the sending client computing device 120, from an email application on the client computing device 120, from a filter associated with or included at an email server 60 of the email application of the client computing device 120, directly from the email server 60, or from a variety of points in response to the user 12 generating a message and/or sending the message. The RAV may also be generated from the client app 132 of the receiving client computing device 130. The receiving user 13 may receive an indication of the new message 162 from the sending user 12 and desire authentication and verification of the message 162. Accordingly the user 13 may initiate a RAV via the client app 132 on the second client computing device 130.

In other embodiments, a RAV may be generated before sending the message 162 and/or in conjunction with sending the message 162. A tool or add-on may be provided for and/or integrated into the email application on the first computing device 120. An option may be selected for a RAV at the time of composing the message 162 and/or instructing the email application to send the message 162. The RAV may include a cryptographic checksum to enable a rapid determination whether the RAV was received from a legitimate source (e.g., the sender client computing device 120, the receiver client computing device 130, the email server 60, or the like) and not tampered with or altered enroute to the CAV system 110.

A RAV is received at the CAV system 110. A cryptographic checksum (e.g., a Merkle tree) may be confirmed by the CAV system 110 to better ensure the RAV is legitimate. The RAV may then be digitally signed by a digital signature of the CAV system. The digital signature may be generated based on the RAV and a private key of the CAV system 110.

The digitally signed RAV may be transmitted from the CAV system 110 to the client computing device 120, and may be specifically transmitted to the client app 122 of the client computing device 120. The client app 122 may prompt a user for input indicating desire to authenticate and verify the message 162 sent to the second client computing device 130 of the receiving user 13. The prompt may be in the form of a new entry for the message 162 in a list of communications/messages to be authenticated and verified. If input is received by the client app 122 from the user 12 to approve or otherwise confirm sending of the message 162, then an indication 166 is sent by the client computing device 120 to confirm the sending of the electronic message 162. The indication 166 includes a timestamp of when the indication was sent from the client computing device 120 and a checksum (e.g., a Merkle tree) incorporating the confirmation and the timestamp. The indication 166 may also include a confirmation tag (e.g., an approval/denial). The checksum may incorporate the confirmation tag.

In some embodiments, the indication 166 is provided from the client computing device 120 directly to the recipient client computing device 130. In other embodiments, an indication is first sent to the CAV system 110 to provide a confirmation or otherwise confirm to the CAV system 110 the sending of the message 162 and then the CAV system 110 receives the indication 166 from the client computing device 120 and may in turn forward (e.g., after digitally signing) or generate and send the indication 166 to the recipient computing device 130 to authenticate and verify the electronic communication to the recipient client computing device 130. Stated differently, the client computing device 120 may provide an authentication and verification indication 166 to the recipient client computing device 130 either directly (over a network) or via the CAV system.

The authentication and verification indication 166 sent to the recipient client computing device 130 may include, or may be, a digital signature. The digital signature may be sent within, accompanying, or in conjunction with the message 162 to produce a digitally signed message 162. Stated otherwise, a digital signature may be used to digitally sign the message 162 to provide authentication and verification of the sending of the message 162. The digital signature generated to authenticate and verify the electronic communication may be based on the message and a private key of the public-private key pair of the sending client computing device 120. The digital signature may be cryptographically bound to the message 162, providing the recipient computing device 130 proof of authentication of the identity of the sender 12 and verification of the intent and content of the message 162. The digital signature may be bound to the message 162 in the sense that it is only valid for the message 162, though the digital signature may be sent separately, whether in a separate data package or separate in time, from the message 162.

In FIG. 1, the second client computing device 130 is described as a recipient of an electronic communication (e.g., the email message 162). However, the second user 13 may also send a message to the first user 12, in which case the foregoing description is performed in the other direction from the point of view of the second client computing device 130 sending a message to the first client computing device 120. As such, the system 100 can facilitate an interaction between the users 12, 13 involving a two-way communication or exchange of data. An interaction involving two-way communication may facilitate specialized scenarios, such as transactions. The ability of the system 100 to enable authentication and verification of the two-way communications, and to provide proof of such to third-parties, enables these interactions to be considered with greater validity (e.g., legally binding on the parties).

For example, a President of a company may wish to send an order to a supplier. Under present technology, use of email, text, and other forms of electronic communication by themselves cannot be confidently used by themselves to initiate a transaction in a legally binding manner. A text alone could be a spoof. Similarly, an email alone cannot be relied upon by the supplier as arriving from the President, because the President's email could have been hacked. The present embodiments address these concerns such that a text or an email could produce a transaction in which the company purchases product from the supplier. An assumption is that the President and the supplier have installed the client app 122, 132 and verified their identity and the message communication channel (e.g., email) by the two-channel authentication described (e.g., email and SMS text), and the public key of each has been registered. Via a split secret, the CAV system can be sure that the President has full control over both channels (e.g., email and SMS text) and can provide the client app 122 an indication that the first computing device 120 sent a message to the second communication device 130. The client app 122 can prompt for confirmation input and can provide (possibly via the CAV system 110) an authentication and verification indication (e.g., a digital signature bound to the message) to the second computing device.

The foregoing description is described with the electronic communication message in the form of an email message 162. Nevertheless, the present disclosure contemplates that an electronic message could be sent in any form, through any communication channel, including but not limited to SMS text, instant message, SWIFT, SMPP, XMPP, proprietary telephony system, telegram system, and any electronic communication channel by which an event (e.g., any signal or data arriving to a recipient that may be perceivable as an event) can be detected to invoke a RAV.

The client computing devices 120, 130 in FIG. 1 are depicted as a mobile client computing device 120 and a desktop client computing device 130. Security enclaves are available for client computing devices, such as the desktop client computing device 130. Although such security enclaves may operate differently from and/or be handled differently from a SIM and/or IMSI, they can nonetheless provide a tie to a real world user. Moreover, one embodiment of the present disclosure may be a system 100 in which both client computing devices 120 are mobile smartphone client computing devices.

The systems 100 can authenticate and cryptographically verify transactional data integrity between two or more transacting users. The system 100 binds: 1) the user; 2) a client computing device (e.g., a mobile phone or secure authentication token); 3) two or more separate communication channels (e.g., SMS and data on mobile phones); 4) the content to be verified; 5) points 1-4 in time, meaning there is time sensitivity of the verification involved. The system 100 makes possible performing so called event-based authentication on all 5 levels at once and to verify not just identity remotely but also the intention (agreement/liking) of the signed content by the user.

The system allows remote secure binding communication over any type of digital transactional medium such as email, SMS, RESTfull APIs, Blockchains, etc. The security and level of authentication of the disclosed embodiments may be useful in a variety of applications and arenas, and may be sufficient for rigorous standards required in stringent industries (e.g., banking and finance, legal). For example, the disclosed systems and methods may be used as a tool for formalizing and/or documenting financial transactions, legal transactions (e.g., executing contracts) and the like.

Figure 2:
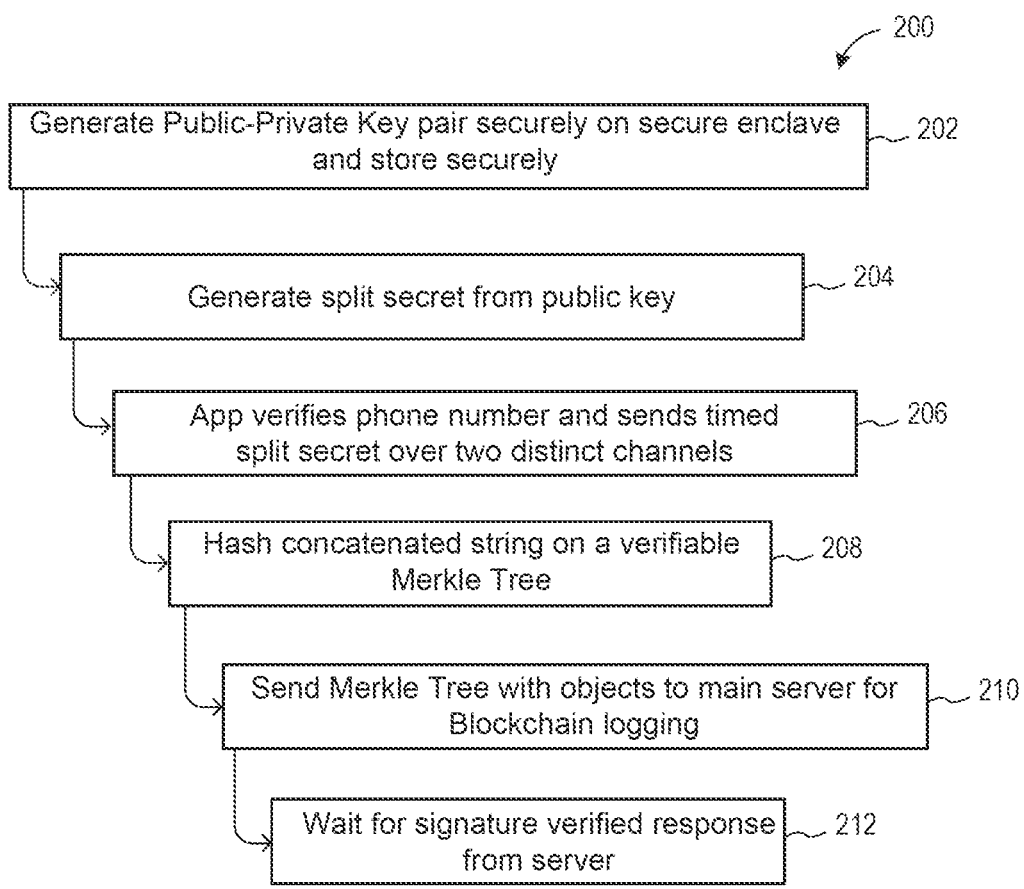
FIG. 2 is a flow diagram of a signature generation process, according to one embodiment of the present disclosure.

FIG. 2 is a flow diagram of a method 200 of signature generation, according to one embodiment of the present disclosure. A public-private key pair is generated 202 in a secure manner on or by a secure enclave (e.g., a security chip, SIM, HSM, etc.) of a client computing device (e.g., a mobile smartphone) and stored securely (e.g., on the secure enclave, such as a security chip, SIM, etc.). A secret is generated 204 based on at least the public key and the secret is split into a split secret to be sent over two distinct communication channels to a CAV system. A client application verifies 206 the phone number or other unique identifier of the mobile computing device and sends the timed split secret.

If the data structure is a content addressable data structure and is a blockchain data storage system, a concatenated string is hashed 208 to a verifiable Merkle Tree on the client computing device. The Merkle Tree with objects are sent 210 to a CAV system for logging in the blockchain data storage system. A signature verified response (e.g., a PKI certificate) from the CAV system is awaited 210.

Figure 3:
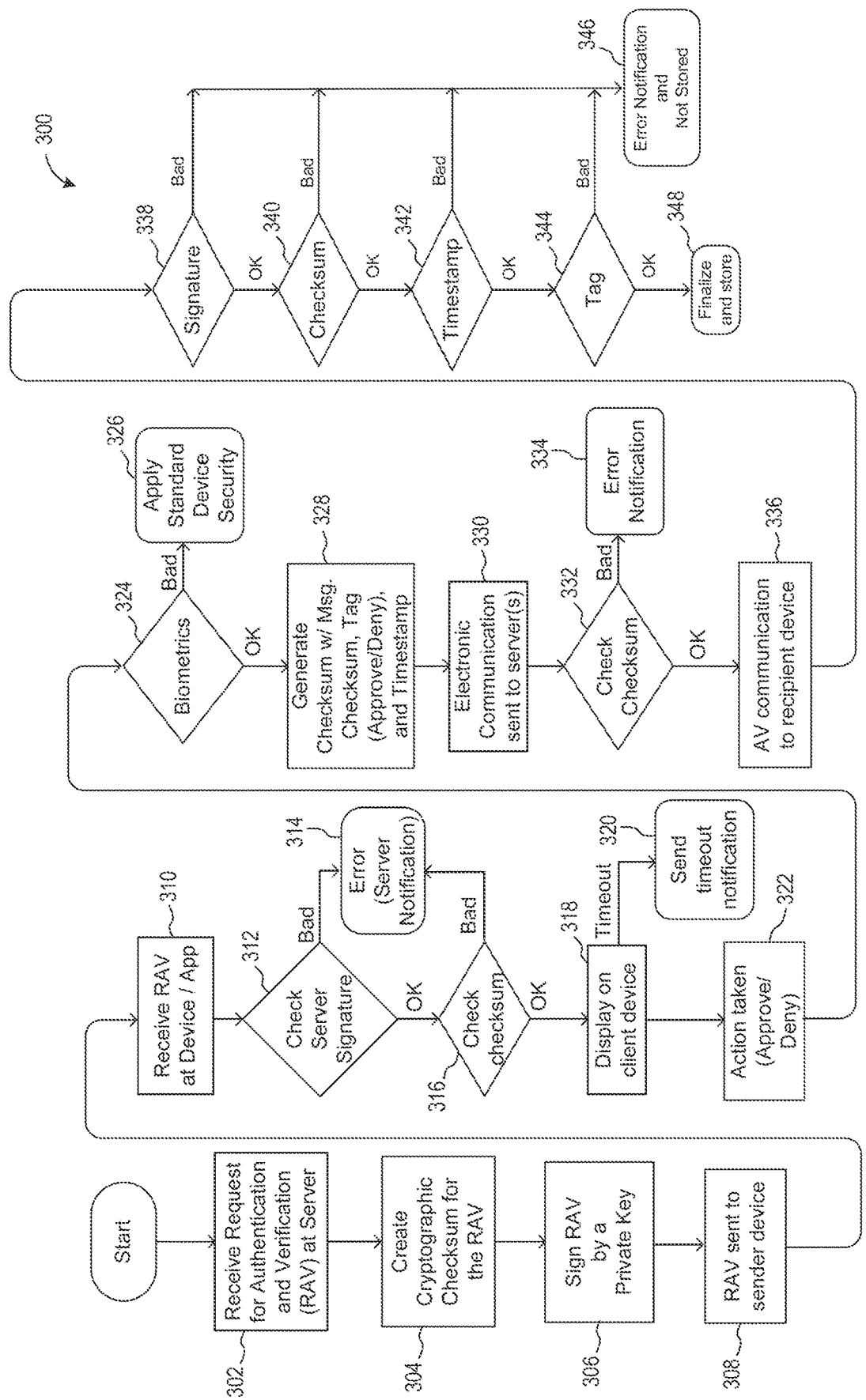
FIG. 3 is a flow diagram of a technical process for authenticated and verified electronic communication, according to one embodiment of the present disclosure.

FIG. 3 is a flow diagram of a technical process 300 of a system for authenticated and verified electronic communication, according to one embodiment of the present disclosure. A request for authentication and verification (RAV) is received 302 at a communication authentication and verification (CAV) server. The request may be generated after an electronic communication is generated and transmitted. The RAV may be generated from a client app of the sending client computing device, from an email application on the client computing device, or from any of a variety of events in response to a user generating an electronic communication and/or sending the electronic communication. The RAV may also be generated from the client app of a receiving client computing device. The receiving user may receive an indication of the new electronic communication from the sending user and desire authentication and verification of the electronic communication. Accordingly the user may initiate a RAV via the client app on a receiving client computing device. In other embodiments, a RAV may be generated before sending the electronic communication and/or in conjunction with sending the electronic communication. A tool or add-on may be provided for and/or integrated into a communication application (e.g., an email application) on the first computing device. An option may be selected for a RAV at the time of composing the electronic communication and/or instructing the communication application to send the electronic communication. The RAV may include a cryptographic checksum to enable a rapid determination whether the RAV was received from a legitimate source and not tampered with or altered enroute to the CAV system. The RAV may also include the electronic communication itself.

The CAV system may create 304 a cryptographic checksum for the RAV, to enable quick identification of tampering or modification of the RAV, and/or to verify that the RAV is coming from a legitimate source. When a user requests that an electronic communication be authenticated and verified, the RAV includes at the very least a checksum (e.g., a hash) of the electronic communication. The RAV need not include the entire electronic communication. Just a hash or other checksum is sufficient for crosscheck the electronic communication and the checksum received to ensure a match; to ensure that the electronic communication being authenticated and verified is the correct electronic communication. The RAV is actually for a particular electronic communication and the checksum ensures such.

The RAV, including the checksum, can also be digitally signed 306 by a private key. For example, the CAV system may sign the RAV using the private key of the public-private key pair of the CAV system. In other embodiments, the RAV may be signed by the sender's client computing device (e.g., by a private key of a public-private key pair of the client computing device). Accordingly, the RAV itself is also a verified electronic communication and the server can check whether the RAV was actually made by the recipient (or the sender). The digitally signed RAV is then sent 308 to the sender client computing device for review by the sender.

The client computing device receives 310 the RAV. More specifically, a client app on the client computing device may receive 310 the RAV for prompting the sender user to approve the message. The client computing device also checks 312 the CAV system digital signature. This check 312 can confirm that the RAV is actually coming from the CAV system. If the check 314 is bad, then an error (e.g., server notification error) can be generated 314. If the server signature is ok, then the client computing device checks 316 the checksum for the RAV. If the check 316 is bad, then an error (e.g., server notification error) can be generated 314. If the check is ok, then the client computing device displays 318 the RAV, which may include displaying the electronic communication and prompting for approval or denial of sending the electronic message. If a timeout occurs (e.g., the user does not approve or deny the electronic communication within a pre-determined period of time, a timeout notification can be sent 320. Input from the user is received indicating an action taken 322 to approve or deny. The input can be incorporated into the RAV and/or a checksum as a tag (e.g., approve/deny).

Biometric input may also be checked 324. For example, some client computing devices may include fingerprint readers, or facial recognition, or other biometric sensors. A biometric input may be captured and checked 324 to confirm identity of the user. The biometric input may be added to the checksum and/or stored, such as in the blockchain data storage system, for later use as proof of authentication of identity of the sender and verification of intent of the sender of the electronic message. If the biometric input is checked 324 and determined to be bad, standard device security may be applied 326 (e.g., locking the display screen, disabling input, disabling the device, etc.). If the biometric input is ok, a checksum is generated 328 including the checksum of the electronic message, a tag indicating approval or denial of the electronic message, and a timestamp. In some embodiment, the checksum may be generated 328 to include the biometric input as well. The electronic communication with the checksum can be sent 330 to the CAV system and any other server(s) involved in the channel of communication to deliver the authenticated and verified electronic communication to the recipient computing device.

The CAV system checks 332 the checksum before forwarding the electronic communication and/or confirmation of authentication and verification of the electronic communication to the recipient computing device. If the checksum is bad, an error notification 334 is generated. If the checksum is ok, the authenticated and verified communication (or indication thereof) is sent 336 to the recipient client computing device.

The recipient client computing device then has a number of checks to perform to confirm authentication and verification of the electronic message. The recipient client computing device checks 338 the digital signature, checks 340 the checksum (generated 328 by the sender client computing device), checks 342 the timestamp, and checks 344 the tag (approval or denial). If any of these checks 338, 340, 342, 344 is bad, an error notification is generated and the electronic communication is not stored as authenticated and verified. In other words, the electronic communication is treated as fraudulent or otherwise not legitimate and in essence discarded. If these checks 338, 340, 342, 344 are all okay, then the electronic communication is finalized and stored, such as in a content addressable data storage system for later reference (e.g., proof to a third party).

Figure 4:
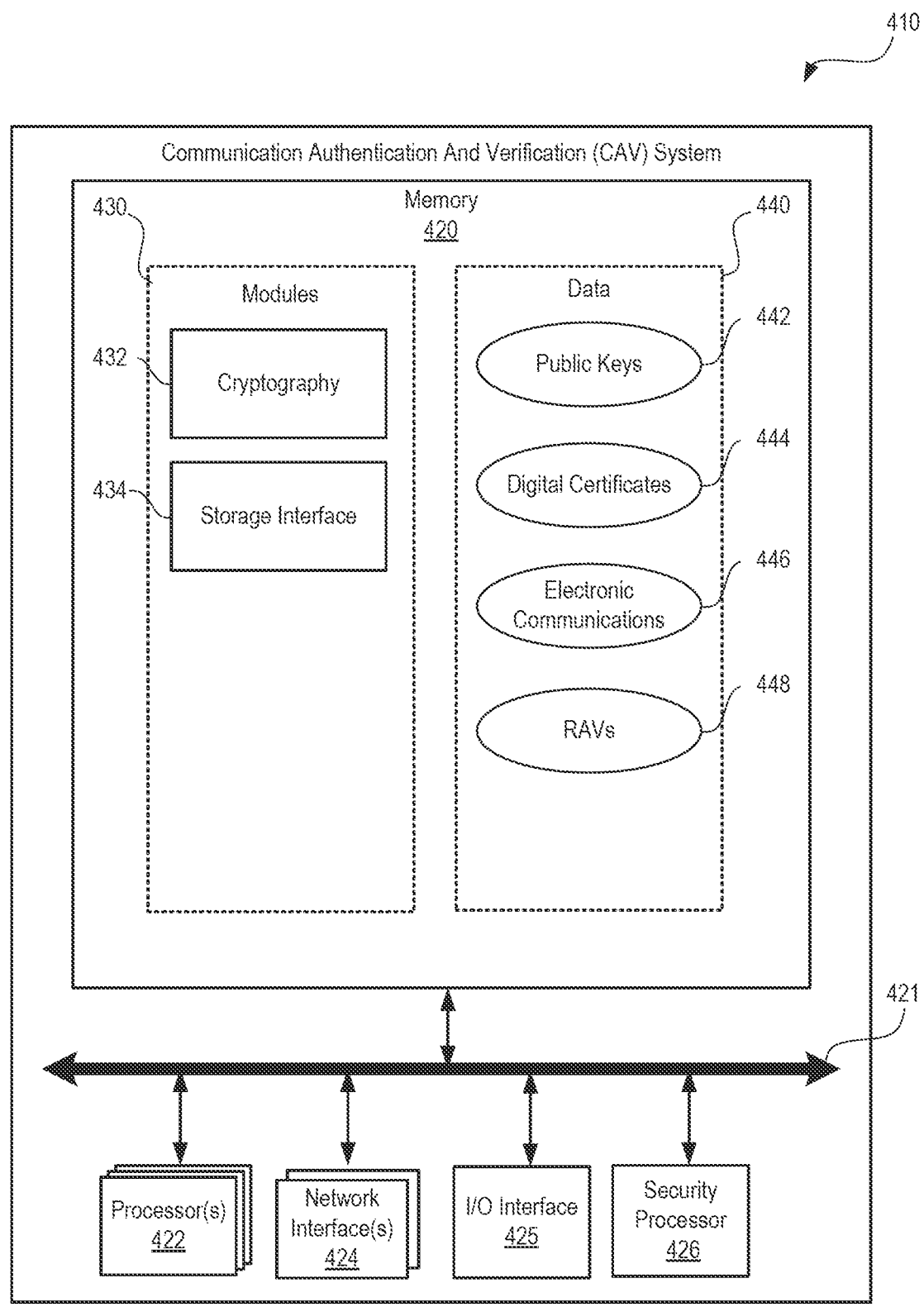
FIG. 4 is a block diagram of a communication authentication and verification server, according to one embodiment of the present disclosure.

FIG. 4 is a block diagram of a communication authentication and verification server 410, according to one embodiment. The communication authentication and verification server 410 can facilitate authentication and verification of electronic communications between two users, and more specifically between two client communication devices. The communication authentication and verification server 410 can include a memory 420, one or more processors 422, one or more network interfaces 424, an input/output interface 425, a security processor 426 (e.g., a security chip), and a system bus 421. The communication authentication and verification server 410 may be the same as or analogous to the communication authentication and verification server 110 in FIG. 1.

The one or more processors 422 may include one or more general purpose devices, such as an Intel®, AMD®, or other standard microprocessor. The one or more processors 422 may include a special purpose processing device, such as ASIC, SoC, SiP, FPGA, PAL, PLA, FPLA, PLD, or other customized or programmable device. The one or more processors 422 can perform distributed (e.g., parallel) processing to execute or otherwise implement functionalities of the presently disclosed embodiments. The one or more processors 422 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 420 may include static RAM, dynamic RAM, flash memory, one or more flip-flops, ROM, CD-ROM, DVD, disk, tape, or magnetic, optical, or other computer storage medium. The memory 420 may include a plurality of program modules 430 and program data 440. The memory 420 may be local to the communication authentication and verification server 410, as shown, or may be distributed and/or remote relative to the communication authentication and verification server 410.

The program modules 430 may include all or portions of other elements of the system 410. The program modules 430 may run multiple operations concurrently or in parallel by or on the one or more processors 422. In some embodiments, portions of the disclosed modules, components, and/or facilities are embodied as executable instructions embodied in hardware or in firmware, or stored on a non-transitory, machine-readable storage medium, such as the memory 420.

The instructions may comprise computer program code that, when executed by a processor and/or computing device, cause a computing system (such as the processors 422 and/or the communication authentication and verification server 410) to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

The memory 420 may also include program data 440. Data generated by the system 410, such as by the program modules 430 or other modules, may be stored on the memory 420, for example, as stored program data 440. The stored program data 440 may be organized as one or more databases. In certain embodiments, the program data 440 may be stored in a database system. The database system may reside within the memory 420. In other embodiments, the program data 440 may be remote, such as in a distributed computing and/or storage environment. For example, the program data 440 may be stored in a database system on a remote computing device. In still other embodiments, portions of program data 440 may be stored in a content addressable storage system, such as a blockchain data storage system.

The input/output interface 425 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network interfaces 424 may facilitate communication with other computing devices and/or networks such as the network 10 and the telecommunications network 20 in FIG. 1 and/or other computing and/or communications networks. The network interface 424 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network interface 424 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 421 may facilitate communication and/or interaction between the other components of the system, including the one or more processors 422, the memory 420, the input/output interface 425, the network interface(s) 424, the input/output interface 425, and the security processor 426.

As noted, the communication authentication and verification server 410 also includes various program modules 430 (or engines, elements, or components) to implement functionalities of the system 410, including a cryptography module 432 and a storage interface module 434.

The cryptography module 432 provides functionality for checking checksums, processing receipt of two halves of a split secret, confirming digital signatures, registering public keys, and digitally signing electronic communications.

The storage interface module 434 enables the system 410 to function as a gateway to a content addressable storage system, such as a blockchain data storage system.

The system 410 also includes public keys 442, digital certificates 444, electronic communications 446, and requests for authentication and verification 448 that may be stored in the program data 440 which may be generated, accessed, and/or manipulated by the program modules 430.

The security processor 426 may comprise a secure chip component that is physically separated from the one or more processors 422. The security processor 426 may enable generation of public-private key pairs for the system 410. The security processor 426 may perform checksums and generate digital signatures.

Figure 5:
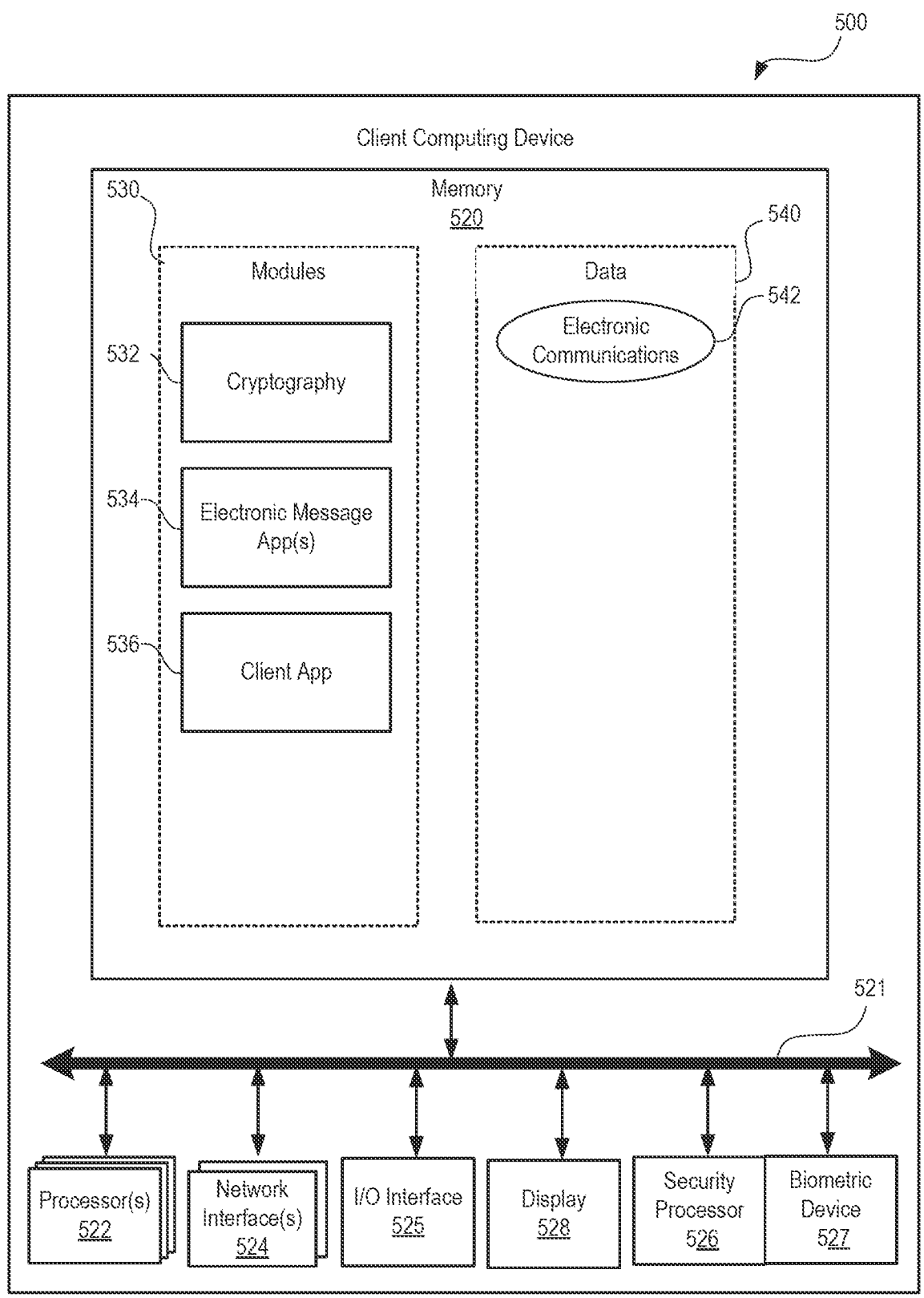
FIG. 5 is a block diagram of a client computing device for authenticated and verified electronic communication from a sender to a receiver, according to one embodiment of the present disclosure.

FIG. 5 is a block diagram of a client computing device 500 for authenticated and verified electronic communication from a sender to a receiver, according to one embodiment of the present disclosure. The client computing device 500 may facilitate sending and receiving of electronic communications with other parties, and more specifically with other client computing devices. The client computing device 500 may enable authenticated and verified electronic messages to be sent to another party and to be received from another party. The client computing device 500 may include a memory 520, one or more processors 522, one or more network interfaces 524, an input/output interface 525, a security processor 526 (e.g., a security chip), a biometric device 527, a display 528, and a system bus 521. In some embodiments, these components may be analogous to or otherwise have similar characteristics to those component in FIG. 4. The client computing device 500 may be the same as or analogous to the client computing devices 120, 130 of FIG. 1. The client computing device 500 may be a mobile smartphone. The client computing device 500 may also be any other type of client computing device, such as a laptop, a tablet, or desktop.

The memory 520 may include a plurality of program modules 530 and program data 540.

The program modules may include a cryptography module 532, one or more electronic message applications 534, and a client application 536 for authentication and verification of electronic messages.

The cryptography module 532 provides functionality for checking checksums, generating a split secret, confirming digital signatures, and digitally signing electronic communications.

The one or more electronic message applications 534 may facilitate composition or other generation of electronic communications. Examples of electronic message applications 534 may include email apps, SMS text apps, instant messaging apps, and the like.

The client app 536 provides interfacing and functionality with a communication authentication and verification system, such as the system 410 of FIG. 4 and the system 110 of FIG. 1. The client app 536 may be the same or similar to the client apps 122, 132 of FIG. 1. The client app 536 may enable a user to provide input to authenticate and verify electronic messages sent to other users. The client app 536 may also enable a user to request authentication and verification of electronic messages received from other users.

The memory 520 may also include program data 540. Data generated by the client computing device 500, such as by the electronic message app(s) 534 and the client app 536, or other modules, may be stored on the memory 520, for example, as data 540. Electronic messages 542 may be stored as program data 540.

The network interfaces 524 may facilitate communication with other computing devices and/or networks such as the network 10 and the telecommunications network 20 in FIG. 1 and/or other computing and/or communications networks. For example, the network interfaces 524 may include a Wifi interface for interfacing with a wireless network and ultimately to the Internet. The network interfaces 524 may also include a telecommunication network interface for communication via a telephony provider's telecommunication network.

The display 528 may be a touchscreen display to present graphical and other visual information to a user. The display 528 may enable the client computing device 500 to prompt a user for approval or denial of sending of a communication to another user.

The security processor 526 may comprise a secure chip component that is physically separated from the one or more processors 522. The security processor 526 may enable generation of public-private key pairs for the system 510. The security processor 526 may perform checksums and generate digital signatures.

The biometric device 527 enables a user to provide biometric input for further authentication of the user's identity. In many cases, the biometric device 527 is integral to, integrated with, or the same as the security processor 526. The biometric device may comprise any of a number of devices including, but not limited to, technology for one or more of fingerprint recognition, voice recognition, iris recognition, retina recognition, and face recognition.

Figure 6:
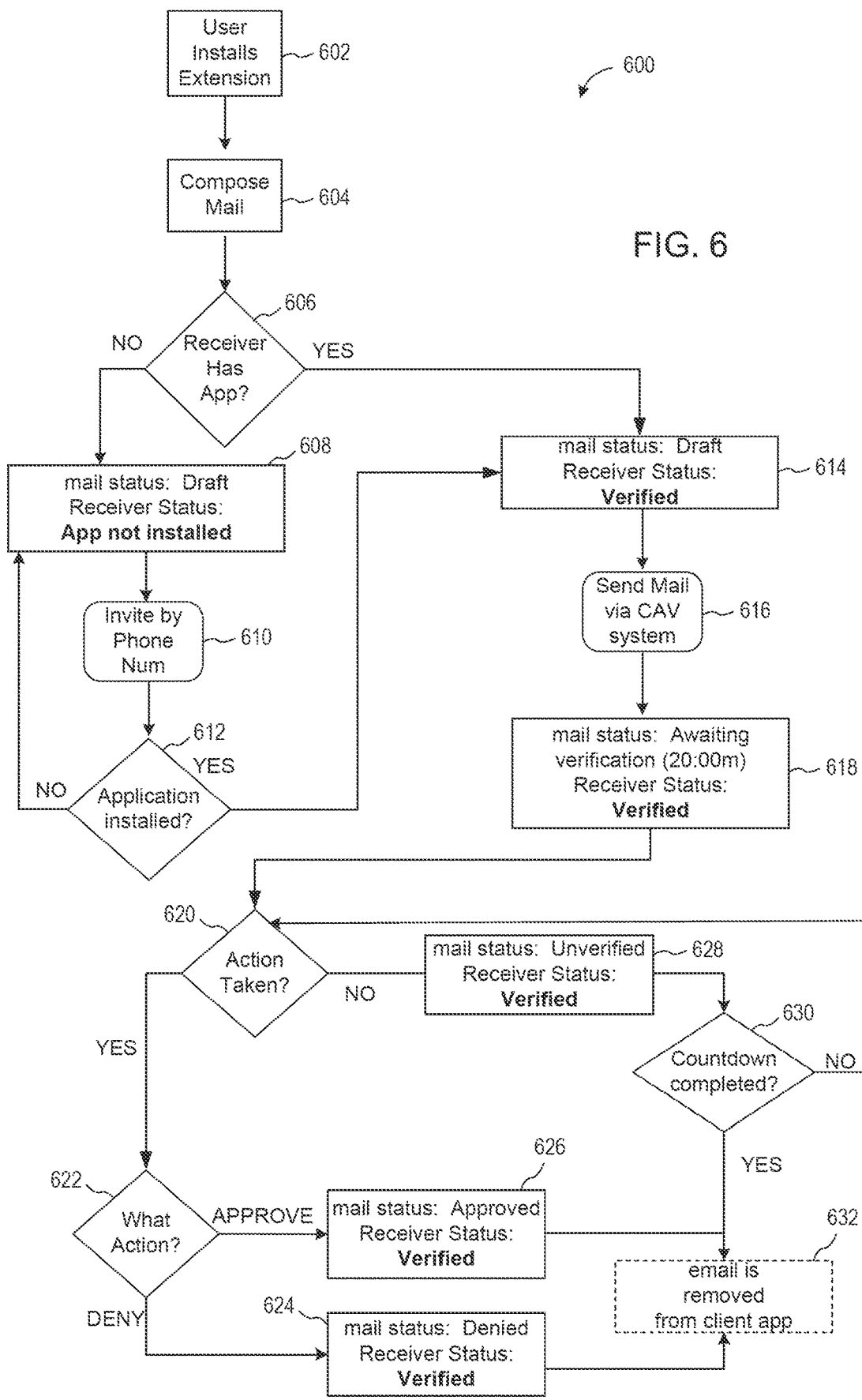
FIG. 6 is a flow diagram of scenario of an authenticated and verified communication, according to one embodiment of the present disclosure.

FIG. 6 is a flow diagram of a user experience 600 of an authenticated and verified communication, according to one embodiment of the present disclosure. A user installs 602 the extension or client app (e.g., client app 122 of FIG. 1, or client app 536 of FIG. 5) on a client computing device. The user composes 604 an electronic message, such as an email. A determination 606 is made whether the intended recipient of the electronic message has the client app installed on the recipient client computing device. If the determination 606 is made that the receiver has the app, the status 614 of the electronic message is: mail status: draft; receiver status: verified. The status 608 if the receiver does not have the app is: mail status: draft; receiver status: app not installed. An invitation 610 by phone number can be provided to invite the recipient to install the client app. If a determination 612 is made that the application is not installed, the status 608 remains. If the determination 612 is that the application is installed, the status 614 of the electronic communication may change to: mail status: draft; receiver status: verified.

Once the receiver status is verified, and the electronic communication is in a draft form, the electronic message (e.g., email) is sent via a communication authentication and verification system (e.g., the CAV system 110 of FIG. 1, or the CAV system 410 of FIG. 4). Sending the email message changes the status 618 of the electronic communication to: mail status: awaiting verification; receiver status verified. A timeout may be included with the awaiting verification status. For example, a 20 minute time limit may be provided within which the sender client computing device should provide approval to authenticate and verify the electronic communication.

A check 620 whether an action is taken is made to determine if the sender has approved the electronic communication. If yes, a determination 622 is made whether the action was to deny or to verify. If the determination 622 is that the action taken was to deny, then the status 624 of the electronic communication changes to: mail status: denied; receiver status: verified. If the determination 622 is that the action taken was to approve, then the status 626 of the electronic communication changes to: mail status: approved, receiver status: verified. After approval or denial, the electronic communication (e.g., email) can be removed 632 from the client application.

If the check 620 whether an action is taken is no, the status 628 of the electronic communication changes to: mail status: unverified; receiver status: verified. A determination 630 is made whether the countdown (or timeout) has completed. If the determination 630 is that the countdown has not completed, the process returns to a determination 620 whether an action has been taken. If the determination 630 is that the countdown has been completed, the electronic communication (e.g., email) can be removed 632 from the client app.

As can be appreciated, other user experiences are possible and within the scope of the present disclosure.

FIGS. 7A and 7B are views of a user interface 702 of a client computing device 700 for authenticated and verified electronic communication, according to one embodiment of the present disclosure. In FIG. 7A, the user interface 702 presents a listing 704 of electronic messages 705. In FIG. 7A, only a single electronic message 705 is depicted, but the listing 704 may have a plurality of messages. Selection of a message 705 (e.g., by touch on a touchscreen display, by mouse click, or the like) advances the user interface 702 to display the electronic message 706

In FIG. 7B, the user interface 702 is displaying the content 706 of the electronic message 705 for review by the user. The user interface 702 further provides an "Approve" input component 708 and a "Deny" input component 710, which allow a user to provide input to either approve or deny sending of an electronic communication (e.g., see action taken 322 of FIG. 3, or action taken 620 of FIG. 6). The action taken can be provided as a tag to a communication authentication and verification (CAV) server to facilitate authentication of the sender of the message and verification of the content of the message and the intent of the sender of the message. The tag can be incorporated into a Merkle tree to be stored in a content addressable data storage system, such as a blockchain, for later use as proof of authentication and verification of the electronic message.

Example Embodiments

Some examples of embodiments of the present disclosure are provided below.

Example 1. A device for authenticated and verified electronic communication from a sender to a receiver, comprising: a security processor to generate a public-private key pair using a unique identifier of the client device as a seed, wherein an identity of a user of the device has been verified by an issuer of one or both of the security processor and the device; a communication interface to provide electronic connectivity to a remote communication authentication and verification (CAV) server and to a recipient client computing device, the communication interface providing electronic communications via a first communication channel and electronic communications via a second communication channel; one or more processors to: generate a split secret including a public key of the public-private key pair; transmit via the first communication channel of the communication interface a first half of the split secret to the CAV system (e.g., to establish user control over the first communication channel); transmit via the second communication channel of the communication interface a second half of the split secret to the CAV system (e.g., to establish user control over the second communication channel); receive via the communication interface an identity certificate from the CAV system, the identity certificate generated based on the public key, the identity certificate evidencing the public key is registered such as on a public key infrastructure (PKI) with an authority entity such as a certificate authority; digitally sign an electronic communication to the recipient client computing device to produce a digitally signed electronic communication and a digital signature generated based on the electronic communication and a private key of the public-private key pair; transmit via the communication interface the digitally signed electronic communication to the recipient client computing device; and transmit via the communication interface the digital signature from the client computing device to the recipient client computing device.

Example 2. The device of Example 1, wherein the first communication channel is of a distinct type from a type of the second communication channel.

Example 3. The device of Example 1, wherein the first and second communication channels are distinct and each comprises a channel over one of a short message service (SMS) system, an email system, a proprietary telephony system, a telegram system, an instant messaging system, a Society for Worldwide Interbank Financial Telecommunications (SWIFT) system, and XMPP.

Example 4. The device of Example 1, wherein the digitally signed electronic communication and the digital signature are transmitted together in a single integrated data package or a single transmission.

Example 5. The device of Example 1, wherein the digitally signed electronic communication and the digital signature are transmitted separately (e.g., in a different data packages and/or via different communication channels).

Example 6. The device of Example 1, wherein the one or more processors are further to prompt a user for input to request authentication and verification of an electronic communication.

Example 7. The device of Example 1, wherein the one or more processors are further to transmit the digitally signed electronic communication and digital signature to the CAV system for storing.

Example 8. The device of Example 1, further comprising a biometric device to capture biometric input to support authentication of the identity of the user of the device.

Example 9. A system for authenticated and verified electronic communication involving two parties, comprising: a security processor to enable a system public-private key pair, wherein an identity of the system has been verified by an issuer of one or both of the security processor and the device; a communication interface to provide electronic connectivity to a remote client computing device and to a remote recipient client computing device, the communication interface facilitating electronic communications via a first communication channel and electronic communications via a second communication channel; one or more processors to: receive from the client computing device a first half of a split secret via the first communication channel, the split secret including a public key of a client public-private key pair generated by one or more security processors of the client computing device; receive from the client computing device a second half of the split secret via a second communication channel; reconstitute the split secret by combining the first half of the split secret with the second half of the split secret; and if reconstituting the split secret results in a valid public key: register the public key (e.g., on a public key infrastructure (PKI)) with an authority entity (e.g., a certificate authority); and transmit an identity certificate to the client computing device to evidence the public key is registered with the authority entity, the identity certificate including the public key.

Example 10. The system of Example 9, wherein the first communication channel is of a distinct type from a type of the second communication channel.

Example 11. The system of Example 9, wherein the one or more processors are further to: receive a request for authentication and verification of an electronic communication sent to a recipient client computing device from the client computing device, the electronic communication being digitally signed by a digital signature generated based on the electronic communication and a private key the client computing device; confirm a cryptographic checksum for the request; digitally sign the request by a server digital signature generated based on the request and a private key of the system public-private key pair; transmit, via the communication interface, the digitally signed request for authentication and verification of an electronic communication to the client computing device; receive indication from the client computing device providing a confirmation tag (e.g., an approval/denial) to confirm sending of the electronic communication to the recipient client computing device, the indication including a timestamp of when the indication was sent from the client computing device and a checksum (e.g., a Merkle tree) incorporating the confirmation and the timestamp; and send, via the communication interface, the indication to the recipient computing device to authenticate and verify the electronic communication to the recipient client computing device.

Example 12. The system of Example 11, wherein the one or more processors send the indication to the recipient computing device separate from sending the authenticated and verified electronic communication.

Example 13. The system of Example 11, wherein the one or more processors are further to store the authenticated and verified electronic communication in a content addressable data storage system.

Example 14. A method to authenticate and verify an electronic communication involving two parties, comprising: generating (e.g., by a security chip) a public-private key pair using a unique identifier of a client computing device as a seed, wherein an identity of a user of the client computing device has been verified by an issuer of one or both of the security chip and the client computing device; transmitting from the client computing device a first half of a split secret via a first communication channel to a communication authentication and verification (CAV) server to establish user control over the first communication channel, the split secret including a public key of the public-private key pair; transmitting from the client computing device a second half of the split secret via a second communication channel to the CAV system to establish user control over the first communication channel; receiving at the client computing device an identity certificate from the CAV system, the identity certificate generated based on the public key, the identity certificate evidencing the public key is registered (e.g., on a public key infrastructure (PKI)) with an authority entity (e.g., a certificate authority); digitally signing an electronic communication to produce a digitally signed electronic communication and a digital signature generated based on the electronic communication and a private key of the public-private key pair; transmitting the digitally signed electronic communication from the client computing device to a recipient client computing device; and transmitting the digital signature from the client computing device to the recipient client computing device.

Example 15. The method of Example 14, wherein the first communication channel is of a distinct type from a type of the second communication channel.

Example 16. The method of Example 14, wherein the first and second communication channels are distinct and each comprises a channel over one of a short message service (SMS) system, an email system, a proprietary telephony system, a telegram system, an instant messaging system, a Society for Worldwide Interbank Financial Telecommunications (SWIFT) system, and XMPP.

Example 17. The method of Example 14, wherein the digitally signed electronic communication and the digital signature are transmitted together in a single integrated data package or a single transmission.

Example 18. The method of Example 14, wherein the digitally signed electronic communication and the digital signature are transmitted separately (e.g., in different data packages and/or via different communication channels).

Example 19. The method of Example 14, further comprising: prompting a user for input indicating desire for authentication and verification of an electronic communication to another party; receiving input from the sender of the electronic communication, the input indicating approval of the electronic communication to authenticate and verify the electronic communication.

Example 20. The method of Example 14, further comprising transmitting the digitally signed electronic communication and digital signature to the CAV system for storing.

Example 21. The device of Example 14, further capturing biometric input to support authentication of the identity of the user of the device.

Example 22. A method to authenticate and verify an electronic communication involving two parties, comprising: receiving, at a server computing device from a client computing device, a first half of a split secret via a first communication channel; receiving, at the server computing device from the client computing device, a second half of the split secret via a second communication channel; reconstituting at the server computing device the split secret by combining the first half of the split secret with the second half of the split secret; if reconstituting the split secret results in a valid public key: registering the public key (e.g., such as on a public key infrastructure (PKI)) with an authority entity (e.g., a certificate authority); and transmitting an identity certificate to the client computing device to evidence the public key is registered with the authority entity, the identity certificate including the public key; receiving at the server computing device a request for authentication and verification of an electronic communication to a recipient client computing device, the electronic communication being digitally signed by a digital signature generated based on the electronic communication and a private key of the public-private key pair of the client computing device; confirming a cryptographic checksum for the request for authentication and verification of an electronic communication; digitally signing the request by a server digital signature generated based on the request and a private key of the server computing device; transmitting the digitally signed request for authentication and verification of an electronic communication to the client computing device; receiving indication from the client computing device providing a confirmation tag (e.g., an approval/denial) to confirm sending of the electronic communication to the recipient client computing device, the indication including a timestamp of when the indication was sent from the client computing device and a checksum (e.g., a Merkle tree) incorporating the confirmation and the timestamp; and sending the indication to the recipient computing device to authenticate and verify the electronic communication to the recipient client computing device.

The present disclosure describes systems and methods by which electronic or digital communication can be both cryptographically and legally securely associated with a person, as well as that person's intention of the signed data be cryptographically verified to attempt to address the challenges with presently available electronic communication.

The disclosed embodiment dissociate unique identifier (UID) and key generation from the central intermediary server, reducing the intermediary server to a Content Distribution Network (CDN) or data routing service which cannot interfere with the correctness of the data being exchanged. Even if the central server is unreachable or is down, the received and signed data packages can still be manually verified and used for legal and regulatory purposes.

Different jurisdictions have different identity verifications and Know Your Customer (KYC) laws for the sale of mobile phone numbers. The disclosed identity and UID/Public Key association method can be legally binding in jurisdictions where a) enough such data is collected by the mobile telephony providers; and b) it is legally possible to associate an asymmetric cryptographic key this way with a secondary piece of information such as a Public Key. Nonetheless, even without such regulation, the association of the phone number with the key provides considerable additional security for online verification and greatly helps to mitigate social engineering attacks such as email spear-phishing.

The disclosed embodiments allow for legally authenticating and cryptographically verifying electronic communication data integrity between two or more users. The disclosed systems may include a mobile phone software application as well as a secure chip, and a secure biometric user authentication component, all installed and/or connected to/on the sending user's phone. The secure chip component securely generates and stores asymmetric cryptographic keys, as well as cryptographically signs outgoing transactions. The mobile phone software securely receives a server generated user specific cryptographic certificate token. The mobile phone software receives this token over the secondary channel, which in this example is SMS. A user's device-phone number specific Universal Identifier can be generated on the user's phone by hashing into a cryptographic Merkle Tree the server generated certificate, the user's phone number, as well as the Public key which may be generated on the user's device's secure chip. The so-generated Hash/Unique Identifier serves for global unique identification of the User and device pair, as well as verification of the public key of the user.

The Merkle-ized input data (Phone number, public key, and cryptographic certificate) are in this way cryptographically associated with one another. When any signature is performed with the associated public key, the signed content can be proven to be as well associated with the other Merkle-ized inputs. Therefore, the signature can more easily be accepted as legally binding as the additional identity information required can be independently proven. The checksums/hashes/UIDs of any transaction signed in this fashion is sent for time-stamping and storage to one or more independent notarization/timestamping servers. The so-generated outgoing transactions are therefore legally witnessed and signed and can be used in many jurisdictions as legal proof of both identity as well as intention.

The service provider providing the mobile phone software can never falsify identity authentication nor transaction integrity due to the asymmetric cryptographic keys never leaving the mobile phone's secure component. After initial authentication and verification application registration and setup, the mobile software provider is not needed anymore for either identity authentication nor transaction verification as both can be done with the device's asymmetric cryptographic keys offline without the presence of the software provider. The transactions themselves don't need to be stored with any particular storage service provider, and can be stored Peer-to-Peer as well. Upon transaction verification request by either the sender or the receiver, the transaction is sent to the sender's mobile application for full viewing, at which point the sender may be required to either deny or approve the transaction. Approval can be provided by using user biometrics such as a fingerprint, iris, or face scan. Upon biometric approval the secure chip signs the transaction and the mobile software send the now cryptographically signed transaction to the requested storage destination.

The disclosed embodiments provide real time authentication of 1) the sender's legally verifiable identity and 2) the sender's cryptographically verifiable intention and consent of the information sent. The disclosed processes use asymmetric public-private key encryption together with an external identity provider, and a secure chip component, which allows the sender to both authenticate their identity legally as well as verify their intention in real time, rather than upon login.

The disclosed embodiments greatly reduce a risk of identity theft such as though socially engineering the transfer of the mobile phone number of the user to the attacker. This is achieved by relying on the public-private key pair which remains at all times in the devices secure chip and never leaves the secure environment.

```
UserID generation:
    UserID = Hash((Hash(PhoneNumber.TimedServerSecret)..PublicKey)
    S/Kademlia based IPFS identity generation:
        difficulty = <integer parameter> n = Node{ } do { n.PubKey, n.PrivKey =
PKI.genKeyPair( ) n.NodeId = hash(n.PubKey) p =
count_preceding_zero_bits(hash(n.NodeId)) } while (p < difficulty)
```

Upon first connecting, peers exchange public keys, and check: hash(other.PublicKey) equals other.NodeId. If not, the connection is terminated.

It will be obvious to those having skill in the art that many changes may be made to the details of the above-described embodiments without departing from the underlying principles of the invention. The scope of the present invention should, therefore, be determined only by the following claims.

The invention claimed is:

1. A method of a first client computing device of a system for authenticating a communication between two parties, comprising:
    generating a key pair using a unique identifier of the first client computing device;
    generating a secret using a first key of the key pair;
    transmitting a first portion of the secret via a first communication channel controlled by a user of the first client computing device to a communication authentication and verification (CAV) device;
    transmitting a second portion of the secret via a second communication channel controlled by the user to the CAV device, wherein the second communication channel is separate from the first communication channel; and
    receiving, from the CAV device, a certificate corresponding to a registration of the first key with an authority entity of the system; and
    after receiving the certificate:
        generating a digital signature using a second key of the key pair; and
        sending, to a second client computing device of the system, a message and the digital signature.

2. The method of claim 1, wherein the key pair is generated by a security chip of the first client computing device.

3. The method of claim 1, wherein the first client computing device comprises a telephony device that communicates on a telephony network, and wherein the first communication channel performs communications using the telephony network.

4. The method of claim 3, wherein the second communication channel does not use the telephony network.

5. The method of claim 1, wherein the first client computing device comprises a telephony device that communicates on a telephony network, and wherein the key pair is generated using an International Mobile Subscriber Identity (IMSI) of the telephony device.

6. The method of claim 1, further comprising storing the second key of the key pair in a removable hardware security module (HSM).

7. A communication authentication and verification (CAV) device of a system for authenticating a communication between two parties, the CAV device comprising a controller having one or more processors, coupled to memory, wherein the one or more processors execute computer-readable instructions stored in the memory to:
    receive a first portion of a secret from a first client computing device via a first communication channel;
    receive a second portion of the secret from the first client computing device via a second communication channel, wherein the second communication channel is separate from the first communication channel;
    identify a first key used by the first client computing device using the first portion of the secret and the second portion of the secret;
    register the first key with an authority entity of the system; and
    send a certificate corresponding to the registering of the first key with the authority entity of the system to the first client computing device.

8. The CAV device of claim 7, wherein the one or more processors execute computer-readable instructions stored in the memory to:
    store data related to an authenticated communication in a distributed environment, wherein the data comprises at least one of:
        a request for authentication and verification (RAV),
        an indication from the first client computing device, the indication confirming that the first client computing device sent the communication, or
        biometric input of a user, the user controlling the first client computing device, the biometric input authenticating an identity of the user.

9. The CAV device of claim 7, further comprising a storage interface to enable a communication between the CAV device and a content-addressable storage system.

10. The CAV device of claim 7, wherein the one or more processors execute computer-readable instructions stored in the memory to:
    receive a request for authentication and verification (RAV) of a communication from the first client computing device to a second computing device;
    confirm a cryptographic checksum for the RAV to confirm the communication is from the first client computing device;
    digitally sign the RAV using the first key; and
    forward the digitally signed RAV to the first client computing device.

11. The CAV device of claim 10, wherein the one or more processors execute computer-readable instructions stored in the memory to:
    send an indication from the first client computing device to the second computing device to authenticate the communication.

12. The CAV device of claim 10, wherein the one or more processors execute computer-readable instructions stored in the memory to:
    notify the first client computing device in response to the CAV device failing to authenticate or verify that the communication is from the first client computing device; and
    perform at least one of:
        locking a graphic user interface (GUI) of the first client computing device to block access to the first client computing device;
        disabling input capability of the first client computing device; or
        disabling the first client computing device.

13. The CAV device of claim 10, wherein the one or more processors execute computer-readable instructions stored in the memory to:
    set a timeout period to approve a communication by the first client computing device in response to failing authenticate or verify that the communication is from the first client computing device;
    send a notification to the first client device about the timeout period in response to the CAV device not receiving the approval from the first client computing device within the timeout period, wherein the timeout notification indicates that authentication or verification failed in response to the CAV device not receiving the approval from a user within the timeout period; and
    approve authorization and verification of the communication in response to the user approving the communication within the timeout period.

* * * * *